US007424421B2

(12) United States Patent
Okumura

(10) Patent No.: US 7,424,421 B2
(45) Date of Patent: Sep. 9, 2008

(54) WORD COLLECTION METHOD AND SYSTEM FOR USE IN WORD-BREAKING

(75) Inventor: Kaoru Okumura, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 10/792,443

(22) Filed: Mar. 3, 2004

(65) Prior Publication Data

US 2005/0197829 A1 Sep. 8, 2005

(51) Int. Cl.
*G06F 17/20* (2006.01)
*G06F 17/27* (2006.01)
*G06F 17/30* (2006.01)

(52) U.S. Cl. .................................... 704/8; 704/9; 707/3

(58) Field of Classification Search ........................ None
See application file for complete search history.

(56) References Cited

U.S. PATENT DOCUMENTS

| 5,029,084 | A | * | 7/1991 | Morohasi et al. | 704/9 |
| 5,946,648 | A | * | 8/1999 | Halstead et al. | 704/9 |
| 6,035,268 | A | * | 3/2000 | Carus et al. | 704/9 |
| 6,374,210 | B1 | * | 4/2002 | Chu | 704/9 |
| 6,879,951 | B1 | * | 4/2005 | Kuo | 704/10 |
| 7,113,950 | B2 | * | 9/2006 | Brill et al. | 707/100 |

OTHER PUBLICATIONS

Langer, "Reverse Queries DATR", University of Osnabruck, Germany, pp. 1-7, Nov. 17, 1994.
Davis et al, "Linking as Constraints on Word Classes in a Hierarchical Lexicon", pp. 1-45, Jul. 6, 1999.
Melnik et al., "Building a Distributed Full-Text Index for the Web", ACM Transactions on Information Systems (TOIS), vol. 19, No. 3, pp. 217-241, 2001.
Agichtein et al., "Learning Search Engine Specific Query Transformations for Question Answering", Proceedings of the Tenth International World Wide Web Conference, WWW10, May 1-5, 2001.
Nagarajarao et al., "An Inverted Index Implementation Supporting Efficient Querying and Incremental Indexing", pp. 1-9, May 6, 2002.
Hodge et al., "An Integrated Neural IR System", ESANN'2001 Proceedings, ISBN 2-930307-01-03, pp. 265-270, Apr. 25-27, 2001.
Technical Note TE25, "How to Construct Word-Break Tables", pp. 1-4, Nov. 1, 1987.
Siivola, et al., "Unlimited Vocabulary Speech Recognition Based on Morphs Discovered in an Unsupervised Manner", Eurospeech 2003-Geneva, pp. 2293-2296.

* cited by examiner

*Primary Examiner*—David R. Hudspeth
*Assistant Examiner*—Brian L Albertalli
(74) *Attorney, Agent, or Firm*—John D. Veldhuis-Kroeze; Westman, Champlin & Kelly, P.A.

(57) ABSTRACT

A method, computer readable medium and system are provided which collect new words for addition to a lexicon for an agglutinative language. In the method, a log of queries submitted to a search engine is obtained. The log of queries is sorted to obtain sorted queries. The sorted queries are then filtered using a plurality of heuristic criteria to obtain a candidate list of new words. Words from the candidate list of new words are then added to a lexicon.

20 Claims, 5 Drawing Sheets

WORD COLLECTION METHOD AND SYSTEM FOR USE IN WORD-BREAKING

BACKGROUND OF THE INVENTION

The present invention is related to word-breakers. More particularly, the present invention is related to new word collection methods for use in word-breaking.

Word-breaking is an important component of natural language processing applications that process textual inputs. In particular, word-breaking is important in most search engines. The search engines perform word-breaking on input strings for several purposes. For example, word-breaking is applied to input strings to determine component words of a compound word.

Word-breaking is especially important in agglutinative languages such as Japanese, Chinese and Korean. An agglutinative language is a language in which words are made up of a linear sequence of distinct morphemes, and each component of meaning is represented by its own morpheme. Other examples of agglutinative languages include Sumerian, Hourrite, Ourartou, Basque and Turkish. Generally, in agglutinative languages, words can be compounded without spaces separating the component words.

Search targets frequently contain various new words which are not yet in dictionaries, and which are not represented in a custom lexicon. When unknown words are included in the input string of a search engine query or in a document to be indexed and searched, it is difficult for the word-breaker to properly word-break the string. This is particularly true in languages in which the words are not separated by spaces. This presents the potential for lower precision/coverage in the search results.

Collecting new words for a custom lexicon used by the word-breaker is an endless task. Existing techniques for collecting the new words for the custom lexicon are time consuming and burdensome. Typically, new words are manually collected by search site owners for addition to the custom lexicon used by that search site. New words are also manually collected by developers for inclusion in the next product generation's system dictionary. The time consuming and labor intensive nature of these new word collection techniques leaves much to be desired.

SUMMARY OF THE INVENTION

A method, computer readable medium and system are provided which collect new words for addition to a lexicon for an agglutinative language. In the method, a log of queries submitted to a search engine is obtained. The log of queries is sorted to obtain sorted queries. The sorted queries are then filtered using a plurality of heuristic criteria to obtain a candidate list of new words. Words from the candidate list of new words are then added to a lexicon.

In some embodiments, filtering the sorted queries using the plurality of heuristic criteria to obtain the candidate list of new words further comprises eliminating from the candidate list of new words queries having a length greater than a predetermined threshold length which are likely to be compound words. If desired, in some embodiments length based filtering can be used to eliminate queries having a length shorter than a predetermined threshold length if they are determined to not likely be words, but rather the result of the user accidentally hitting the enter key.

In some embodiments, filtering the sorted queries using the plurality of heuristic criteria to obtain the candidate list of new words further comprises eliminating from the candidate list queries having a frequency of occurrence in the query log which is less than a predetermined threshold frequency of occurrence.

In some embodiments, filtering the sorted queries using the plurality of heuristic criteria to obtain the candidate list of new words further comprises eliminating from the candidate list queries that are already analyzed by a word-breaker as being a single word.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
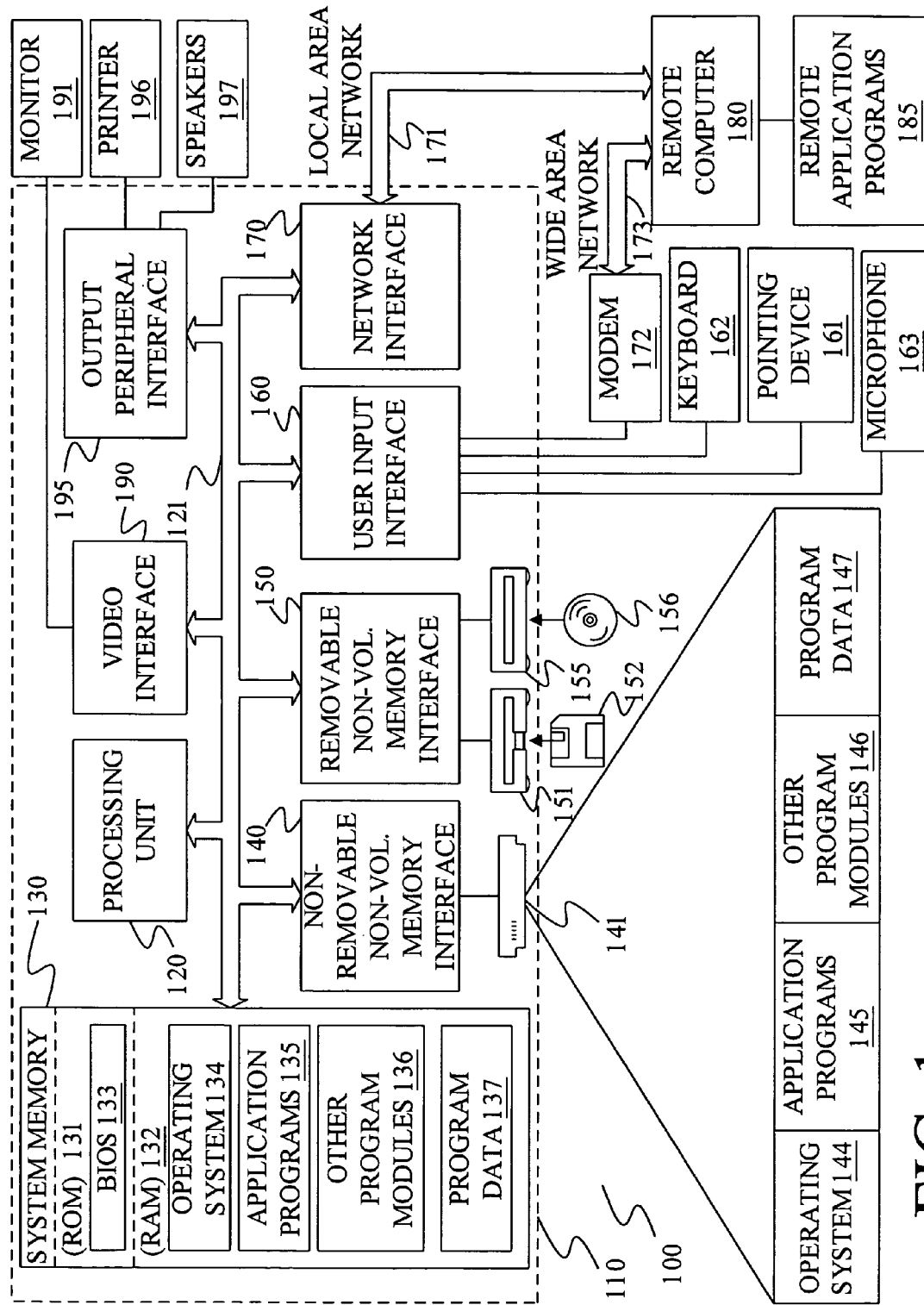
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention includes improved methods for collecting new words to be added to a lexicon used by a word-breaker. Either or both of the collection method and the word-breaker can be implemented in computing environments such as the one illustrated in FIG. 1, or in other types of computing environments. In contrast to conventional methods that typically involve a high degree of manual effort to collect new words for inclusion in a custom lexicon or system dictionary, the methods and systems of the present invention obtain new words automatically, or semi-automatically, utilizing a search query log. The new word collection methods of the present invention are particularly useful for agglutinative languages in which words are compounded without the use of spaces or hyphens between words.

Figure 2:
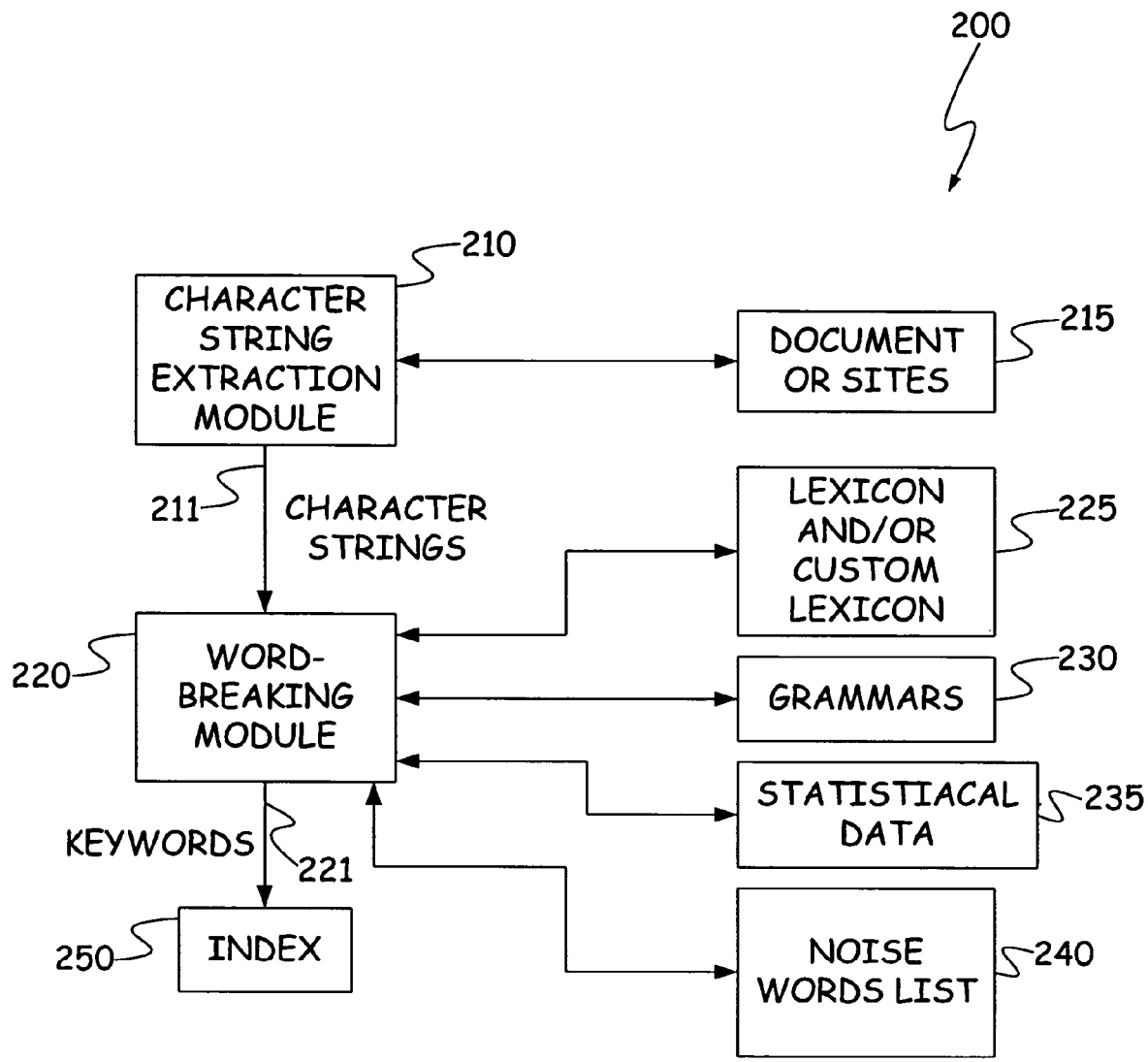
FIG. 2 is a block diagram illustrating one embodiment of a search engine indexing system with which the present invention is useful.

FIG. 2 is a block diagram of a search engine indexing system 200 illustrating one use of word-breaking during a process of indexing documents or websites for later use with a search engine. System 200 includes a character string extraction module 210. At an index time, module 210 extracts character strings 211 from documents or websites (collectively referred to as "documents") shown at 215.

The system 200 also includes a word-breaking module 220 that analyzes the character strings 211 to generate keywords 221. The word-breaking module 220 can function as conventional word-breaking modules function. In the process of generating keywords 221 from character strings 211, word-breaking module 220 utilizes a lexicon 225. Lexicon 225 can be a conventional full lexicon used by a variety of applications, a custom lexicon specific to a particular application, or a combination of the two. In a conventional manner, word-breaking module 220 can also use appropriate grammars 230 and statistical data 235 for the particular agglutinative language of the character strings.

Since some search engines exclude certain noise words, word-breaking module 220 can also access a noise words database or list 240 and subtract or exclude the noise words from the group of resultant words that will eventually be provided as keywords 221. This function can also be implemented in a separate noise words exclusion step by a separate noise words exclusion module if desired. The noise words in noise word list 240 can be customizable or specific to particular search engines since not all search engines are likely to exclude the same noise words. Example noise words might include functional words such as those corresponding to "a" and "the" in the English language. Another example, for the Japanese language, could include the one-character Japanese Kana words. Many other examples of other types of noise words are also possible, and would depend upon the particular agglutinative language.

The resultant keywords 221 provided by word-breaking module 220 are added to an index 250. Index 250 correlates the keywords to the documents 215 from which the original character strings were extracted. These keywords are then used to retrieve appropriate documents in response to a search engine query including the keywords.

Figure 3:
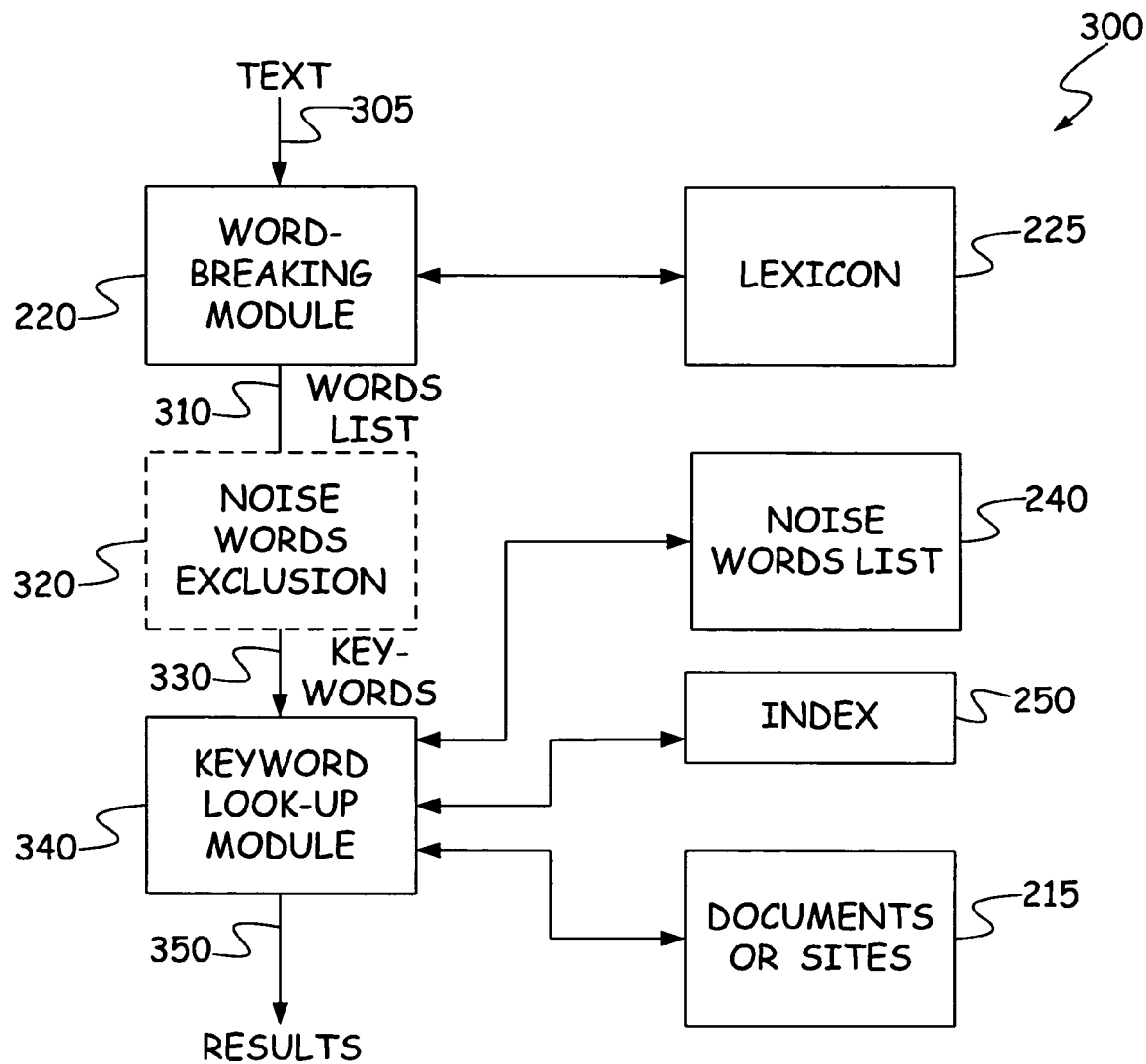
FIG. 3 is a block diagram illustrating one embodiment of a search engine system with which the present invention is useful.

FIG. 3 is a block diagram of a search engine system 300 illustrating one use of word-breaking during a search for documents or websites in response to a natural language user query. System 300 includes word-breaking module 220 that receives a user query in the form a text input 305. The text input 305 is, in the case of agglutinative languages for example, typically in the form of a string of text. The word-breaking module is illustrated as being the same word-breaking module used in system 200 described in FIG. 2. However, this need not necessarily be the case, and differences between the word-breaking modules used in the various systems can exist.

Word-breaking module 220 uses lexicon 225 to perform the word-breaking functions in a known manner. As discussed previously, the word-breaking module can also use grammars, statistical data and other resources to perform the word-breaking functions as is required or most beneficial for the particular language being analyzed. The output of word-breaking module 220 is a words list 310 derived from the text input 305.

Similar to indexing system 200 discussed above, search engine system 300 can exclude noise words. Again, the noise words can include functional words such as equivalents of "a" and "the", or other words that are not rich in content and that do not carry significant meaning. The noise words can be specific to particular languages, with the Japanese Kana words again being an example. Noise word exclusion is optional, and can be implemented in a separate noise word exclusion module 320, or it can be implemented within word-breaking module 220. After noise word exclusion, the result is a list or group of keywords 330.

System 300 also includes a keyword look-up module 340 that compares the keywords 330 to the keywords stored in index 250. For matches of keywords 330 to keywords in index 250, the corresponding documents or sites 215 (or a list of the corresponding documents or sites) are retrieved. Keyword look-up module 340 will typically rank the retrieved documents or sites such that the results 350 are most probably the intended results for the query. For example, module 340 can rank the results based upon frequency of the keywords within the documents or sites, based upon the percentage of the keywords that are actually found in individual documents or sites, or by other ranking criteria.

Figure 4:
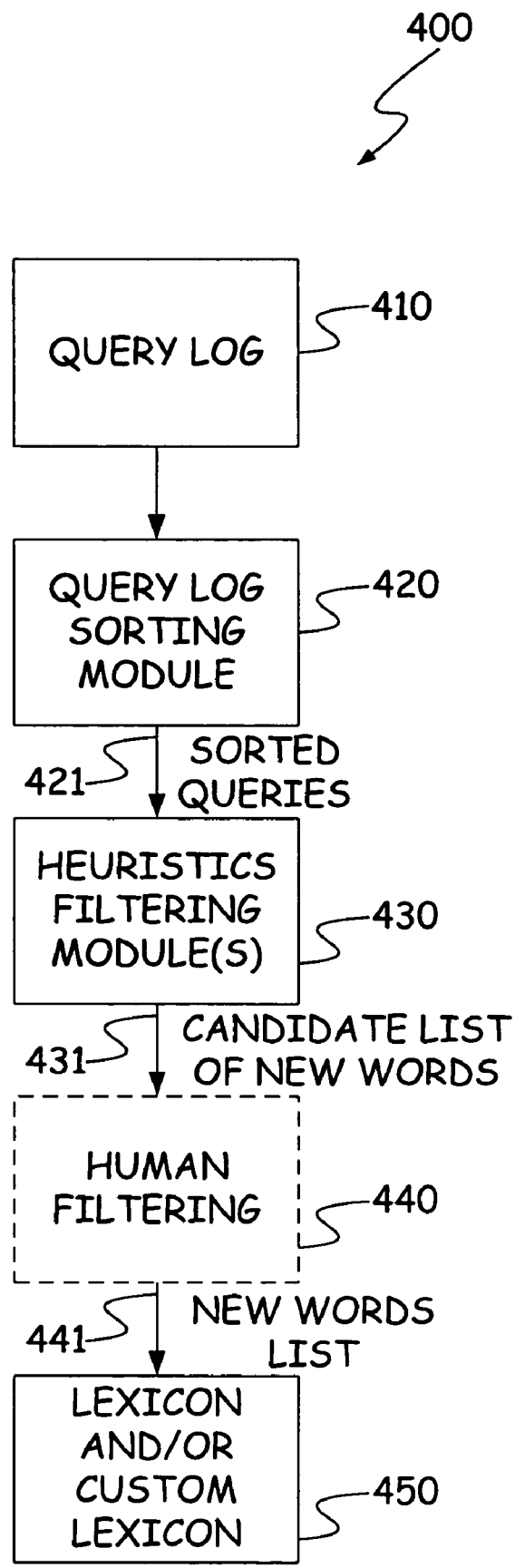
FIG. 4 is a block diagram illustrating one embodiment of a new word collection system and method of the present invention.

Referring now to FIG. 4, shown is a new word collection system 400 in accordance with embodiments of the present invention. The various modules illustrated in FIG. 4 are similarly representative of methods of the present invention. System 400 and its corresponding method are described together in order to better illustrate the invention.

A first step in the new word collection method of the present invention is to obtain a search or query log of a search engine to collect a list of queries that have been submitted in the particular langauage(s). This is illustrated as query log 410 in FIG. 4. Next, the query log is sorted as a function of frequency of occurrence in the log. This step, and its corresponding component in system 400, is represented by query log sorting module 420 that provides as an output the sorted queries 421. The query log can be sorted by frequency of occurrence using any of a number of techniques. For example, frequency of occurrence can be based upon how many times a query has occurred in exactly (or close to exactly) the same form. However, frequency of occurrence can also be based upon grouping similar queries together into a query bundle, even if the queries do not appear in exactly the same form.

Next, the method includes filtering the sorted queries based upon some predetermined heuristics. This is illustrated in FIG. 4 as heuristics filtering module(s) 430, which after filtering provides at output 431 a candidate list of new words. While the heuristics used to filter the sorted queries can vary for particular implementations and/or for different languages, an example of heuristics filtering criteria is illustrated further in FIG. 5.

Figure 5:
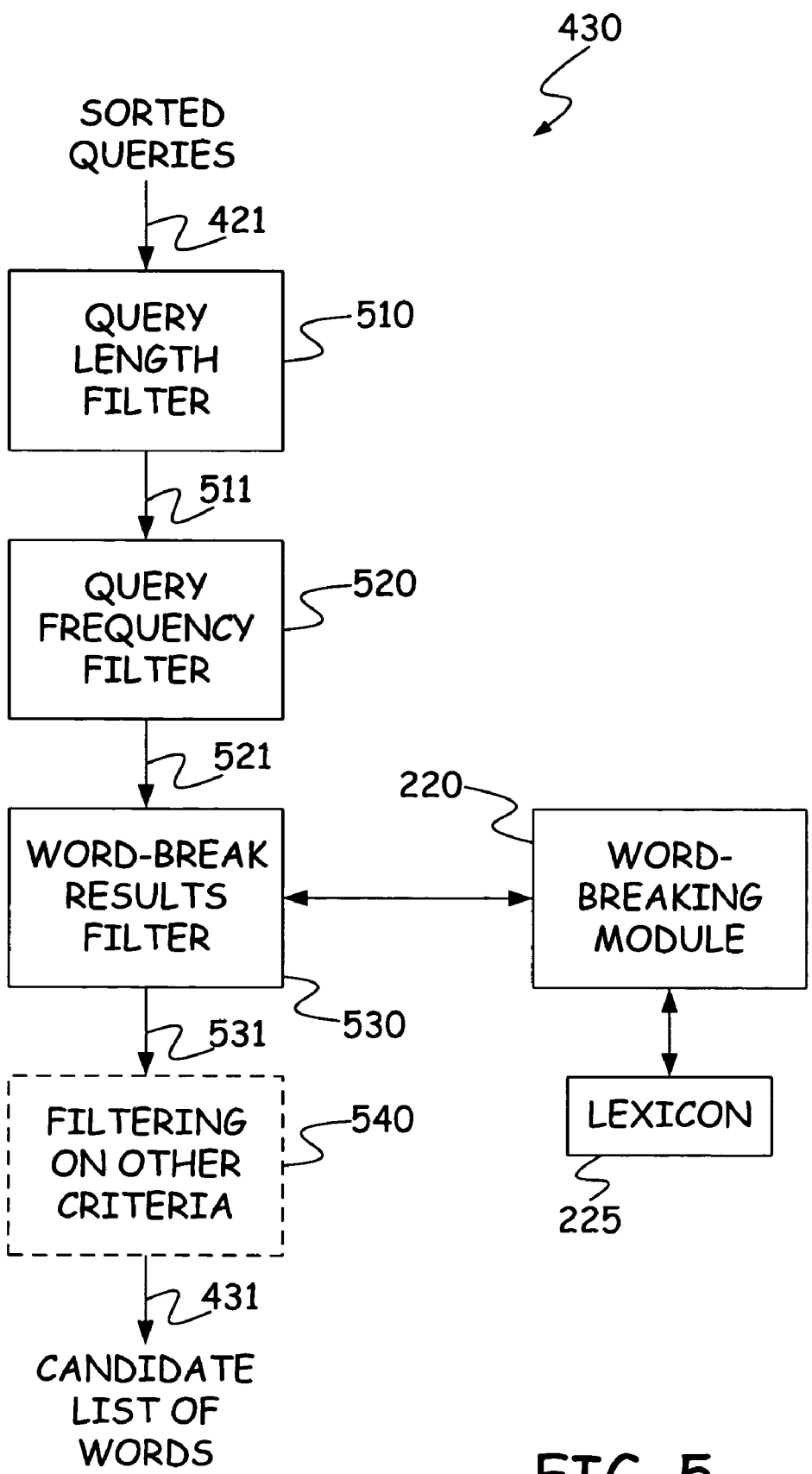
FIG. 5 is a block diagram illustrating one embodiment of the heuristics filtering module(s) shown in FIG. 4.

As shown in FIG. 5, heuristics filtering module 430 (representing heuristics filtering criteria) can include a query length filter 510. Query length filter 510 filters out query strings which are longer and/or shorter than some predetermined numbers of letters or characters, providing at output 511 only queries which pass this criteria. This filtering criterion eliminates from the candidate list of new words strings that are likely to be compound words (longer than an upper threshold) or too short to likely be a new word (shorter than a lower threshold), for example resulting from the user accidentally hitting the enter key. It should be noted that filtering to eliminate words which are too long need not be used in conjunction with filtering words that are too short. In some embodiments, there is no filtering based on words being too short.

Next, the remaining queries are filtered to eliminate those that do not appear frequently enough in the query log. This is illustrated in FIG. 5 as a query frequency filter 520. Query frequency filter 520 filters out query strings which do not appear in the query log more than some predetermined threshold number of times, providing at output 521 only queries occurring frequently enough to pass this criteria. It should be noted that query frequency filter 520 can perform its function prior to query length filter 510 in other embodiments. Similarly, other changes of filtering order are possible.

Next, the remaining queries are filtered based upon word-breaking results. This is illustrated as word-break results filter 530. Word-break results filter 530 compares the remaining queries to word-breaking results and eliminates any queries that are already analyzed by word-breaking module 220 as a single word. In providing the word-breaking results, module 220 uses lexicon 225 and other resources as necessary, including grammars, statistical data, noise words lists, etc as discussed above. The remaining queries that are not already analyzed by the word-breaking module as single words are provided by filter 530 at output 531.

Next, if desired, other filtering criteria can be applied, as represented generically in FIG. 5 as filter 540. For example, when collecting new Japanese words, filter 540 could eliminate all word candidates that are not Hiragana or Katakana words or strings, since Hiragana is the major area where word-breaking difficulties occur when analyzing without knowing the word. Similarly, filter 540 could eliminate all word candidates that are not Hiragana or Katakana words or strings. These are two examples of filtering based upon one or more Japanese character type restrictions. More generally, eliminating queries from the candidate list based upon Japanese character types restrictions can include eliminating queries based upon heuristics on a combination of the character types of the sorted queries. Many other filtering criteria are also possible.

Referring back to FIG. 4, the resulting candidate list of new words 431 can be further filtered by humans (i.e., have humans select or eliminate words from the candidate list) as is shown at 440. The decision of whether to include human filtering is optional and would depend upon particular requirements and a workload/effect or benefit tradeoff. One advantage of the method and system of the present invention is the reduction in human workload to identify new words, particularly in agglutinative languages. Adding human filtering at this point is likely to further enhance the results without adding an overly burdensome workload.

After any human filtering, the remaining query entries are provided as a new words list 441. These new words are added to, or merged with, the custom or full lexicons (collectively shown in FIGS. 2, 3 and 5 as lexicon 225) used for word-breaking in the indexing and search engine query tasks discussed above. The updated lexicon(s), with new words list 441 added, is represented in FIG. 4 at 450. This updated lexicon would then be used in place of original lexicon 225 in future uses of the previously described systems and methods. Further, the resultant new words can be utilized not only for the word-breaking functions of a search engine, but also for any other natural language analysis including word-breaking.

Examples include typo detection functions, alternative suggestion functions (i.e., "Do you mean . . . ?" search engine features), etc.

After updating the lexicon(s) with the new words identified using the present invention, the systems described above can be used to re-index whole documents with the updated lexicon. The updated or new index can then replace the original index for use in search engine query analysis. By identifying new words for addition to the lexicon using the methods and systems of the present invention, improved linguistic analysis results can be achieved. In the search scenario, better search results can be achieved. The present invention greatly reduces the workload necessary to maintain custom lexicons. The result can also be ported into the next generation lexicon, reducing the workload required to update the lexicon.

The following is a Japanese language example of the need for the methods and system of the present invention to identify new words, as well as an example of how the methods and system of the invention would perform within the context of this example. Consider the new Japanese word らるく(laruku). This is a newly coined nickname (short form) of a POP music group, so it would not likely have been added to the system lexicon. As background information, in Japanese, the official name for the POP music group is ラルクアンシエル(in Katakana, "larukuansieru"). The alphabetical notation is "L'ArcenCiel". For purposes of this example assume that らるくhas not in fact been added to the system lexicon.

What happens if the word-breaker does not recognize this word?

Case A: The word-breaker tends to over-break unknown words (this is more common than case B discussed below). In Case A:

The word-breaking result would be らるく(la/ru/ku) or something similar.

If the word-breaker drops one character Kana as a noise word, then all the content or chunk is dropped and this term cannot be searched at all.

Even if the word-breaker does not drop one character Kana as noise words, there are a lot of matches with らor るor く(la or ru or ku), which is a negative factor for the performance, and may cause problems in ranking matching documents.

Additionally, the word-breaker may not consistently perform well in some contexts. Assume that a document contains a phrase らるくに会った(larukuniatta, means "met laruku"). The word-breaking result of this phrase could be らるくに会った(la/ru/kuni/at/ta) which does not match to (la/ru/ku)

Case B: The word-breaker tends to under-break unknown words (using unknown word guessing mechanism). In Case B:

The word-breaking result would be らるく(laruku) or something similar. This is not a bad result.

Still, however, the word-breaker may not consistently perform well in some contexts. Assume that a document contains a phrase らるくに会った( larukuniatta, means "met laruku"). The word-breaking result of this phrase could be らるくに会った(laru/kuni/at/ta), which does not match to (laruku).

What happens if this word is added to the custom lexicon (or merged into the system lexicon)? In both cases A & B described above, expected results would be achieved:

Query: らるく(laruku)->らるく(laruku) as one word.

In a document: らるくに会った(larukuniatta)->らるくに会った(laruku/ni/at/ta)

Therefore, it is important to identify this word as a new word for addition to the lexicon. Consider the process by which this word would be picked-up by the previously described filtering?

It is known that this is a very frequent query.

This query is short enough. This means that this could be one word as opposed to being a compound word or a phrase.

When word-breaking is run on this query, there are two cases, Case A and Case B.

Case A: The word-breaker tends to over-break unknown words (this is more common than Case B):

The word-breaking result would be らるくに会った(la/ru/ku) or something similar.

If the word-breaker drops one character Kana as a noise word, and most parts of the query are dropped as noise words, then the query is definitely the new word candidate!

If the word-breaker does not drop one character Kana as noise words, check to see if the word-breaking results are too tiny Kana chunks. In that case, the query is again a good candidate to be a new word. In general, short chunks with ideographic character(s) do not cause serious search issues. Therefore, these cases may be excluded.

Case B: The word-breaker tends to under-break unknown words:

The word-breaking result is らるくに会った(laruku).

Check whether the string らるくに会った(laruku) is in the lexicon. If it is not in the lexicon, then the query is a good candidate to add to the lexicon as a new word, especially given that the query is all made of Kana.

Although the present invention has been described with reference to particular embodiments, workers skilled in the art will recognize that changes may be made in form and detail without departing from the spirit and scope of the invention.

What is claimed is:

1. A method of collecting new words for addition to a lexicon for an agglutinative language, the method comprising:

obtaining a log of queries submitted to a search engine;
sorting the log of queries to obtain sorted queries;
filtering the sorted queries using a plurality of heuristic criteria to obtain a candidate list of new words, wherein filtering the sorted queries using the plurality of heuristic criteria to obtain the candidate list of new words further comprises eliminating from the candidate list queries which are already analyzed by a word-breaker as being a single word; and
adding words from the candidate list of new words to a lexicon.

2. The method of claim 1, wherein filtering the sorted queries using the plurality of heuristic criteria to obtain the candidate list of new words further comprises eliminating from the candidate list queries having a length greater than a predetermined threshold length.

3. The method of claim 2, wherein filtering the sorted queries using the plurality of heuristic criteria to obtain the candidate list of new words further comprises eliminating from the candidate list queries having a frequency of occurrence in the query log which is less than a predetermined threshold frequency of occurrence.

4. The method of claim 1, and further comprising human filtering the candidate list of new words to obtain a new words list, wherein adding words from the candidate list of new words to the lexicon comprises adding words from the new words list.

5. The method of claim 4, wherein adding words from the candidate list of new words to the lexicon further comprises adding words from the new words list to the lexicon used by the word-breaker to obtain an updated lexicon.

6. The method of claim 1, wherein the agglutinative language is Japanese.

7. The method of claim 6, wherein filtering the plurality of heuristic criteria to obtain the candidate list of new words further comprises eliminating queries from the candidate list based upon a Japanese character type restriction.

8. The method of claim 7, wherein eliminating queries from the candidate list based upon the Japanese character types restriction further comprises eliminating queries which are not Hiragana or Katakana strings.

9. The method of claim 7, wherein eliminating queries from the candidate list based upon the Japanese character types restriction further comprises eliminating queries based upon heuristics on the combination of the character types of the sorted queries.

10. A computer storage media having computer-executable instructions for performing steps comprising:

sorting a log of queries submitted to a search engine in an agglutinative language to obtain sorted queries; and
filtering the sorted queries using a plurality of heuristic criteria to obtain a candidate list of new words for addition to a lexicon, wherein filtering the sorted queries using the plurality of heuristic criteria further comprises eliminating from the candidate list of new words queries having a length greater than a predetermined threshold length.

11. The computer storage media of claim 10, wherein filtering the sorted queries using the plurality of heuristic criteria further comprises eliminating from the candidate list queries which are already analyzed by a word-breaker as being a single word.

12. The computer storage media of claim 10, and further having computer-executable instructions for performing a step comprising adding words from the candidate list of new words to a lexicon.

13. A new word collection system for collecting new words in an agglutinative language, from a log of queries submitted to a search engine, for addition to a lexicon, the system comprising:

a query log sorting component configured to sort the log of queries to obtain sorted queries in the agglutinative language; and
a heuristics filtering component configured to filter the sorted queries in the agglutinative language using a plurality of heuristic criteria to obtain a candidate list of new words, wherein the heuristics filtering component further comprises a word-break results filter configured to eliminate from the candidate list of new words queries which have already been analyzed by a word-breaker as being a single word.

14. The new word collection system of claim 13, wherein the heuristics filtering component further comprises a query length filter configured to eliminate from the candidate list of new words queries having a length greater than a predetermined threshold length.

15. The new word collection system of claim 14, wherein the heuristics filtering component further comprises a query frequency filter configured to eliminate from the candidate list of new words queries having a frequency of occurrence in the query log which is less than a predetermined threshold frequency of occurrence.

16. The computer storage media of claim 10, wherein the agglutinative language is Japanese, and wherein filtering the plurality of heuristic criteria to obtain the candidate list of new words further comprises eliminating queries from the candidate list based upon a Japanese character type restriction.

17. The computer storage media of claim 16, wherein eliminating queries from the candidate list based upon the Japanese character types restriction further comprises eliminating queries which are not Hiragana or Katakana strings.

18. The new word collection system of claim 13, wherein the agglutinative language is Japanese, and wherein filtering the plurality of heuristic criteria to obtain the candidate list of new words further comprises eliminating queries from the candidate list based upon a Japanese character type restriction.

19. The new word collection system of claim 18, wherein eliminating queries from the candidate list based upon the Japanese character types restriction further comprises eliminating queries which are not Hiragana or Katakana strings.

20. The new word collection system of claim 18, wherein eliminating queries from the candidate list based upon the Japanese character types restriction further comprises eliminating queries based upon heuristics on the combination of the character types of the sorted queries.

\* \* \* \* \*